US012570319B2

(12) United States Patent
Yeom et al.

(10) Patent No.: US 12,570,319 B2
(45) Date of Patent: Mar. 10, 2026

(54) METHOD FOR CONTROLLING DRIVING MODE TRANSITION OF AUTONOMOUS DRIVING VEHICLE

(71) Applicants: Hyundai Motor Company, Seoul (KR); Kia Corporation, Seoul (KR)

(72) Inventors: Myung Ki Yeom, Whasung-Si (KR); In Su Kim, Whasung-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 277 days.

(21) Appl. No.: 18/078,515

(22) Filed: Dec. 9, 2022

(65) Prior Publication Data

US 2024/0083460 A1 Mar. 14, 2024

(30) Foreign Application Priority Data

Sep. 8, 2022 (KR) ........................ 10-2022-0114098

(51) Int. Cl.
B60W 60/00 (2020.01)
B60W 30/09 (2012.01)
B60W 30/095 (2012.01)
B60W 30/18 (2012.01)

(52) U.S. Cl.
CPC ........ B60W 60/0015 (2020.02); B60W 30/09 (2013.01); B60W 30/0956 (2013.01); B60W 30/18163 (2013.01); B60W 60/0051 (2020.02); B60W 2554/80 (2020.02)

(58) Field of Classification Search
None
See application file for complete search history.

(56) References Cited

U.S. PATENT DOCUMENTS

| 10,053,074 | B2 | 8/2018 | Kindberg |
| 10,093,292 | B2 | 10/2018 | Moore et al. |
| 10,937,107 | B2 * | 3/2021 | Shalev-Shwartz .......................... B60W 30/095 |
| 11,891,048 | B2 * | 2/2024 | Do ...................... B60T 8/17558 |

(Continued)

FOREIGN PATENT DOCUMENTS

| KR | 20180006003 A | * | 1/2018 |
| KR | 2020-0063314 A | | 6/2020 |
| KR | 2022-0019878 A | | 2/2022 |

OTHER PUBLICATIONS

Machine translation of KR20180006003A (Year: 2018).*

*Primary Examiner* — Navid Z. Mehdizadeh
*Assistant Examiner* — Sarah A. Mueller
(74) *Attorney, Agent, or Firm* — MORGAN, LEWIS & BOCKIUS LLP

(57) ABSTRACT

A method for controlling a driving mode transition of an autonomous driving vehicle may safely perform a lane change to avoid a collision accident with the other vehicle and prevent an injury to a joint, etc., while minimizing a sense of heterogeneity of a driver according to minimization of rotational steering of a steering wheel by determining whether the other vehicle in a next lane suddenly cuts in in an autonomous driving controller while the autonomous driving vehicle is driving in a manual driving mode and determining a safety distance from a rear vehicle to minimize rotational steering of the steering wheel held by the driver and at the same time perform partial braking control by autonomous driving mode transition control using an autonomous driving controller.

19 Claims, 13 Drawing Sheets

(56)　　　　　　References Cited

U.S. PATENT DOCUMENTS

| | | | |
|---|---|---|---|
| 2008/0065328 A1* | 3/2008 | Eidehall | G01S 7/295 |
| | | | 701/301 |
| 2013/0166150 A1* | 6/2013 | Han | B60W 10/18 |
| | | | 701/41 |
| 2017/0052540 A1* | 2/2017 | Lokesh | G01S 19/51 |
| 2017/0113664 A1* | 4/2017 | Nix | G07C 5/0891 |
| 2019/0270452 A1* | 9/2019 | Katsura | B60W 30/10 |
| 2020/0239029 A1* | 7/2020 | Kim | G08G 1/0133 |
| 2023/0202530 A1* | 6/2023 | Abad | G08G 1/0133 |
| | | | 701/26 |
| 2023/0331258 A1* | 10/2023 | Yamada | B60W 60/0051 |

* cited by examiner

FIG. 2

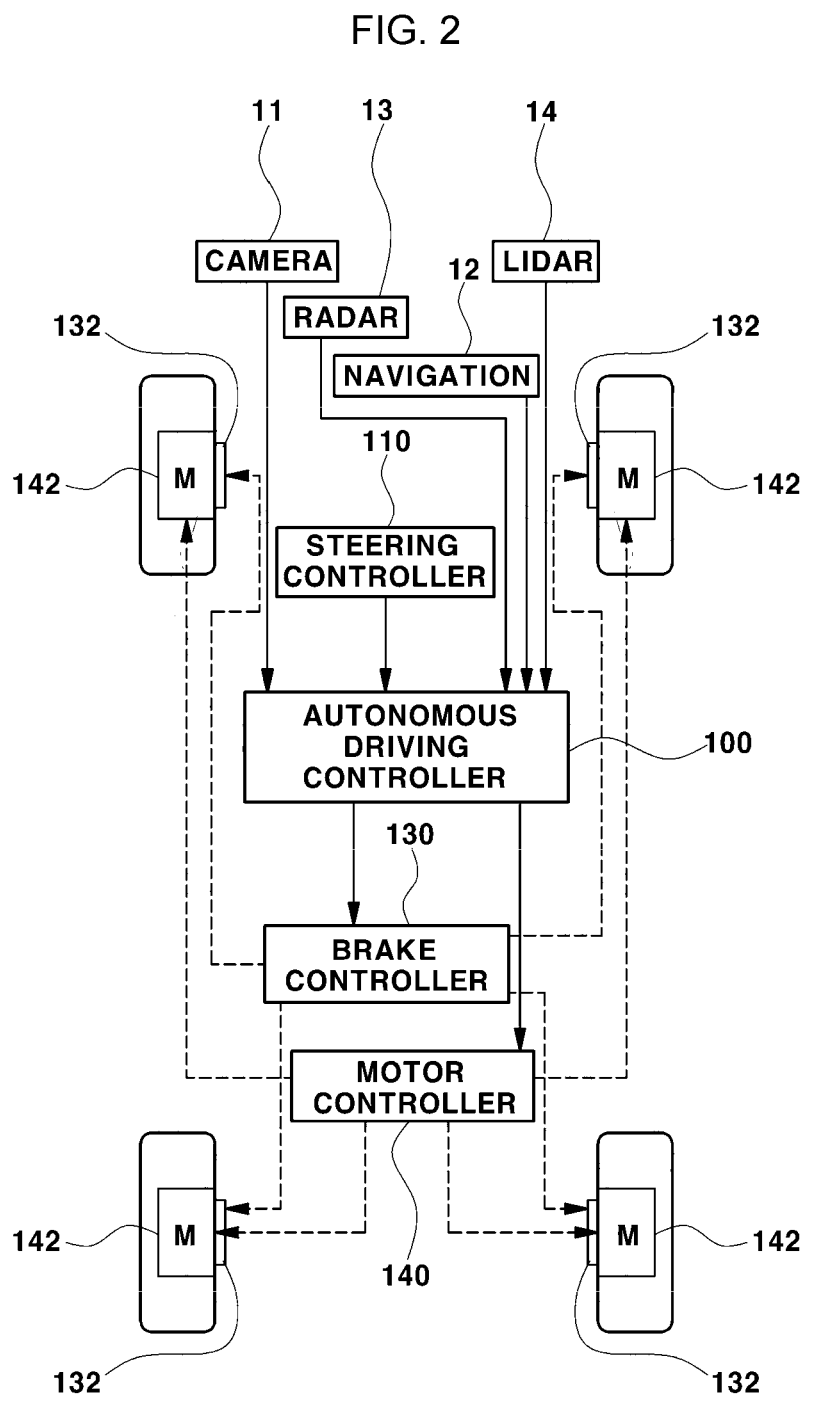

CAMERA  11

RADAR  13

NAVIGATION  12

LIDAR  14

132

142  M

132

142  M

110

STEERING
CONTROLLER

AUTONOMOUS
DRIVING
CONTROLLER  100

130

BRAKE
CONTROLLER

MOTOR
CONTROLLER

Figure 5A:
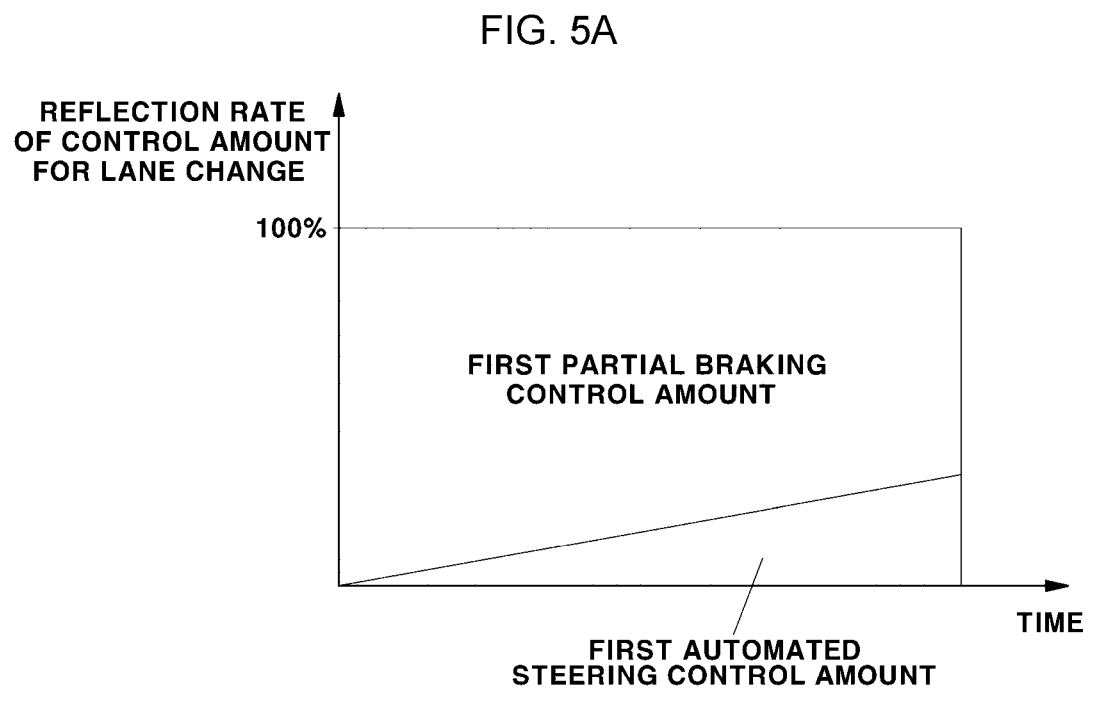

REFLECTION RATE
OF CONTROL AMOUNT
FOR LANE CHANGE

100%

FIRST PARTIAL BRAKING
CONTROL AMOUNT

TIME

FIRST AUTOMATED
STEERING CONTROL AMOUNT

DRIVING TORQUE

BRAKING TORQUE
(REGENERATIVE
BRAKING TORQUE)

LANE
CHANGE
SPACE

OTHER
VEHICLE

HOST
VEHICLE

DRIVING TORQUE

BRAKING TORQUE
(REGENERATIVE BRAKING
TORQUE AND HYDRAULIC
BRAKING TORQUE)

OTHER
VEHICLE

LANE
CHANGE
SPACE

HOST
VEHICLE

METHOD FOR CONTROLLING DRIVING MODE TRANSITION OF AUTONOMOUS DRIVING VEHICLE

CROSS-REFERENCE TO RELATED APPLICATION

The present application claims priority to Korean Patent Application No. 10-2022-0114098 filed on Sep. 8, 2022, the entire contents of which is incorporated herein for all purposes by this reference.

BACKGROUND OF THE PRESENT DISCLOSURE

Field of the Present Disclosure

The present disclosure relates to a method for controlling driving mode transition of an autonomous driving vehicle, and more particularly, to method for controlling a driving mode transition of an autonomous driving vehicle capable of avoiding a risk of collision due to a lane change caused by transitioning to an autonomous driving mode when there is the risk of collision due to an intervening vehicle while the autonomous driving vehicle is driving in a manual driving mode.

DESCRIPTION OF RELATED ART

A driving mode of an autonomous driving vehicle includes a manual driving mode in which a driver may directly intervene in driving, in addition to an autonomous driving mode in which a vehicle travels by itself to a destination without the driver directly manipulating a steering wheel, an accelerator pedal, a brake pedal, etc.

Either an autonomous driving mode controlled by an autonomous driving controller or a manual driving mode controlled by a driver's operation may be selected depending on a driver's preferences.

Usually, in the case where the autonomous driving vehicle is driving in a manual driving mode, when the other vehicle in a next lane cuts in, a driver is notified of a risk of collision with a warning sound or may avoid the risk of collision through simple braking.

However, in the case where the autonomous driving vehicle drives in the manual driving mode, when the other vehicle in a next lane suddenly cuts in, a collision accident may occur if a driver's collision avoidance operation is insufficient or impossible.

To avoid accidents caused by the sudden intervening, when the other vehicle in the next lane suddenly cuts in while the autonomous driving vehicle is driving in the manual driving mode, logic to transit to autonomous driving mode is temporarily executed, so a steering wheel may be steered suddenly in a direction in which the risk of collision is avoided.

However, as the steering wheel of the autonomous driving vehicle is suddenly steered by the transition logic of the autonomous driving mode, the risk of collision due to the sudden intervening of the other vehicle may be reduced, but there is a problem in that the steering wheel is rotated and steered suddenly compared to a steering will of a driver holding a steering wheel, giving the driver a sense of heterogeneity.

Moreover, when the driver is driving in the manual driving mode while holding the steering wheel, if the steering wheel is rotated and steered suddenly in the collision avoidance direction due to the transition logic to the autonomous driving mode, there is a problem in that the driver may expect the breakdown of the vehicle, etc., and may be greatly embarrassed, and the driver may feel a great sense of heterogeneity and may injure joints such as a wrists or elbows.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a method for controlling a driving mode transition of an autonomous driving vehicle configured for safely performing a lane change to avoid a collision accident with another vehicle and preventing an injury to a joint, etc., while minimizing a sense of heterogeneity of a driver according to minimization of rotational steering of a steering wheel by determining whether another vehicle in a next lane suddenly cuts in in an autonomous driving controller while the autonomous driving vehicle is driving in a manual driving mode and determining a safety distance from a rear vehicle to minimize rotational steering of the steering wheel held by the driver and at the same time perform partial braking control by autonomous driving mode transition control using an autonomous driving controller.

The objects of the present disclosure are limited to the above-described objects, and unmentioned or other objects may be appreciated clearly from the following detailed description by a person having ordinary skill in the art to which the present disclosure belongs.

In various aspects of the present disclosures, an exemplary embodiment of the present disclosure provides a method for controlling a driving mode transition of an autonomous driving vehicle, including: checking, by an autonomous driving controller, whether a current driving mode of the autonomous driving vehicle is a manual driving mode; determining, by the autonomous driving controller, whether there is a cut-in vehicle in an adjacent lane; determining, by the autonomous driving controller, whether to maintain a safety distance from a rear vehicle when the autonomous driving controller concludes that there is a cut-in vehicle; checking and setting, by the autonomous driving controller, a lane change space in which a collision with the cut-in vehicle is avoided if the autonomous driving controller concludes that a safety distance from the rear vehicle is not secured; and executing, by the autonomous driving controller, a rotational steering minimization control of a steering wheel and a partial braking control while switching to an autonomous driving mode to move into the set lane change space.

when the autonomous driving controller concludes that the safety distance from the rear vehicle is secured, the autonomous driving controller is configured to perform regenerative braking control or hydraulic braking control to avoid the collision with the cut-in vehicle.

The method may further include: honking, by the autonomous driving controller, a horn to warn the cut-in vehicle that a risk of collision occurs when another vehicle cuts in when the autonomous driving controller concludes that the safety distance from the rear vehicle is not secured.

The lane change space in which the collision with another vehicle may be avoided may be set as a lane change space opposite to another vehicle or a lane change space on a rear side of another vehicle.

The performing of the rotational steering minimization control of the steering wheel and the partial braking control may include: determining whether a steering torque of the steering wheel changes by a driver's manipulation; determining a first automated steering control amount and a first partial control amount for an autonomous driving mode when the steering torque of the steering wheel is less than a reference value; and performing steering wheel steering control according to the first automated steering control amount and the partial braking control according to the first partial control amount to change a lane to the set lane change space.

A ratio between the first automated steering control amount and the first partial control amount may be determined according to a reflection rate of a preset control amount for a lane change, and the preset control amount for the lane change may be a sum of the first automated steering control amount and the first partial control amount.

When determining the ratio between the first automated steering control amount and the first partial control amount, the ratio may be determined so that only the first partial control amount is reflected at an initial time when the lane change starts according to the reflection rate of the preset control amount for a lane change, and may be determined so that the first automated steering control amount increases with a predetermined inclination from the initial time to a time when the lane change ends, and at the same time, so that the first partial control amount decreases with a same inclination thereof.

Automated steering may be performed in a lane change space direction in which the steering wheel is set by the first automated steering control amount by the steering wheel steering control according to the first automated steering control amount, and a driving torque may be applied to an in-wheel motor in an opposite direction to the lane change by the partial braking control according to the first partial control amount, and a regenerative braking torque according to the first partial control amount may be applied to an in-wheel motor in the lane change direction.

The performing of the rotational steering minimization control of the steering wheel and the partial braking control may include: determining whether a steering torque of the steering wheel changes by a driver's manipulation; determining whether a steering direction of the steering wheel by the driver's manipulation coincides with the lane change direction to the set lane change space when the steering torque of the steering wheel is a reference value or greater than the reference value; determining a second automated steering control amount and a second partial control amount for an autonomous driving mode when the autonomous driving controller concludes that the steering direction of the steering wheel by the driver's manipulation coincides with the lane change direction to the set lane change space; and performing steering wheel steering control according to the second automated steering control amount and the partial braking control according to the second partial control amount to change a lane to the set lane change space.

A ratio between the second automated steering control amount and the second partial control amount may be determined according to a reflection rate of a preset control amount for a lane change, and the preset control amount for the lane change may be a sum of a manual steering control amount by the driver's manipulation, the second automated steering control amount, and the second partial control amount.

When determining the ratio between the second automated steering control amount and the second partial control amount to the manual steering control amount by the driver's manipulation, the ratio may be determined so that the second automated steering control amount increases with a predetermined inclination from an initial time to an end time of the lane change according to the reflection rate of the preset control amount for a lane change, and at the same time, is determined so that the second partial control amount decreases with a same inclination thereof.

Automated steering may be performed in a lane change space direction in which the steering wheel is set by the second automated steering control amount in addition to a manual steering control amount by the driver's manipulation by the steering wheel steering control according to the second automated steering control amount, and a driving torque may be applied to an in-wheel motor in an opposite direction to the lane change by the partial braking control according to the second partial control amount, and a regenerative braking torque according to the first partial control amount may be applied to an in-wheel motor in the lane change direction.

The performing of the rotational steering minimization control of the steering wheel and the partial braking control may include: determining whether a steering torque of the steering wheel changes by a driver's manipulation; determining whether a steering direction of the steering wheel by the driver's manipulation coincides with the lane change direction to the set lane change space when the steering torque of the steering wheel is a reference value or greater than the reference value; determining a third partial control amount for an autonomous driving mode when the autonomous driving controller concludes that the steering direction of the steering wheel by the driver's manipulation is opposite to the lane change direction to the set lane change space; and performing the partial braking control according to the third partial control amount to change a lane to the set lane change space.

The third partial control amount may be determined by increasing a reflection rate of the partial control amount by a manual steering control amount in an opposite direction to the lane change direction by the driver's manipulation.

The third partial control amount may include an increment in the partial control amount corresponding to the manual steering control amount in the opposite direction to the lane change direction by the driver's manipulation, and thus, may be determined to be equal to the preset control amount for the lane change.

A driving torque may be applied to an in-wheel motor in an opposite direction to the lane change direction by the partial braking control according to the third partial control amount, and a hydraulic braking torque may be applied to a hydraulic brake mounted on a wheel in the lane changing direction while a regenerative braking torque is applied to an in-wheel motor in the lane change direction.

The method may further include: after the rotational steering minimization control and the partial braking control of the steering wheel are completed, guiding a driver whether to transit to an autonomous driving mode and whether to transit to a manual driving mode.

The method may further include: continuously operating a klaxon for collision avoidance and warning with another vehicle when the lane change space in which the collision with another vehicle may be avoided is not checked or set.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

BRIEF DESCRIPTION OF THE DRAWINGS

FIG. 1 and FIG. 2 are control configuration diagrams for controlling a driving mode transition for a lane change of an autonomous driving vehicle according to an exemplary embodiment of the present disclosure;

FIG. 5A is a graph illustrating an example in which a reflection rate of a control amount for a lane change in the method for controlling a driving mode transition of an autonomous driving vehicle according to an exemplary embodiment of the present disclosure is determined by a first automated steering control amount and a first partial control amount;

Figure 1:
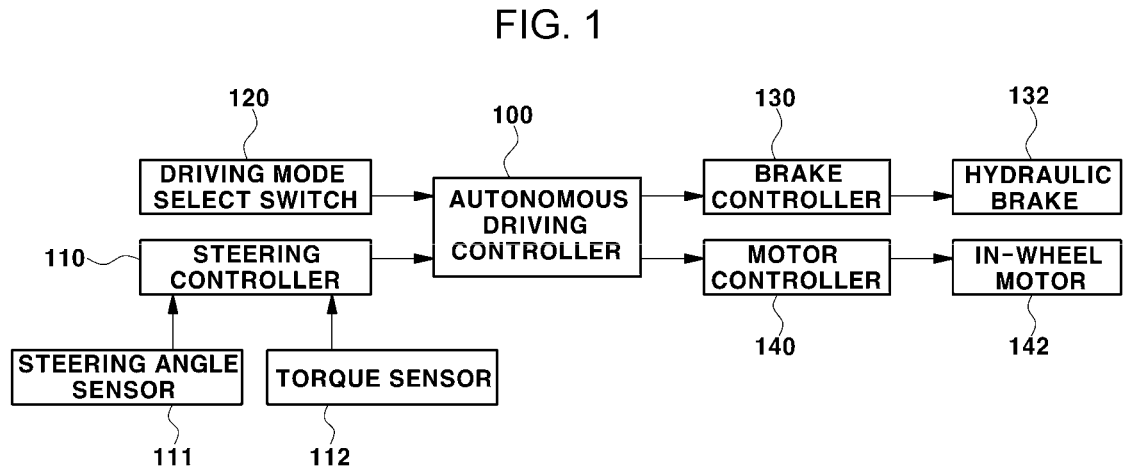

It should be understood that the appended drawings are not necessarily to scale, presenting a somewhat simplified representation of various preferred features illustrative of the basic principles of the present disclosure. The specific design features of the present disclosure as disclosed herein, including, for example, specific dimensions, orientations, locations, and shapes will be determined in section by the particular intended application and use environment.

In the figures, reference numbers refer to the same or equivalent sections of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, various exemplary embodiments of the present disclosure will be described in more detail with reference to the accompanying drawings.

FIG. 1 and FIG. 2 are control configuration diagrams for controlling a driving mode transition for a lane change of an autonomous driving vehicle according to an exemplary embodiment of the present disclosure.

As illustrated in FIG. 1 and FIG. 2, the autonomous driving vehicle is provided with an autonomous driving controller 100 for overall driving control of the autonomous driving vehicle, and a steering controller 110 for notifying whether a steering angle is generated is connected to an input unit of the autonomous driving controller 100 to transmit a signal, and a brake controller 130 and a motor controller 140 are connected to an output unit of the autonomous driving controller 100 to receive a command signal.

As is well known, the autonomous driving controller 100 is configured to receive various types of monitoring information necessary for autonomous driving from an autonomous driving sensing unit that includes a camera 11, a navigation 12, a radio detection and ranging (RADAR) 13, a light imaging detection and ranging (LIDAR) 14, and the like, and perform overall driving control including a driving direction, acceleration, and deceleration, etc., of the vehicle based on the monitoring information.

Furthermore, the autonomous driving controller 100 is configured to perform control to transit a driving mode to an autonomous driving mode or a manual driving mode according to a switching signal of a driving mode select switch 120 which may be operated by a driver.

The steering controller 110 is configured to perform steering control according to a steering will according to autonomous driving logic of the autonomous driving controller 100 or a steering will according to a driver's manipulation of the steering wheel.

Furthermore, the steering controller 110 may be configured to determine whether a steering angle is generated, a steering direction, a steering angle, etc., based on a detection signal of a steering angle sensor 111 mounted on a shaft of a steering wheel, etc., and transmit the determination result to the autonomous driving controller 100.

For example, when the autonomous driving vehicle is driving in an autonomous driving mode or a manual driving mode, the steering controller 110 may be configured to determine whether the steering angle is generated according to the steering will according to the autonomous driving mode of the autonomous driving controller 100 or the steering will according to the driver's manipulation of the steering wheel, a steering direction, an actual steering angle, etc., based on a diction signal of the steering angle sensor 111, and transmit the determination result to the autonomous driving controller 100.

Furthermore, the steering controller 110 may be configured to determine whether a driver holds a steering wheel based on a detection signal of a torque sensor 112 mounted on the shaft of the steering wheel, whether the steering occurs, etc., and transmit the determination result to the autonomous driving controller 100.

The brake controller 130 is configured to control to apply a hydraulic braking torque to a hydraulic brake 132 mounted on each wheel according to a hydraulic braking torque command from the autonomous driving controller 100.

The brake controller 130 may be an integrated electric brake (IEB) controller including electronic stability control (ESC) for body posture control.

The motor controller 140 is for driving torque control and regenerative braking torque control for an in-wheel motor (IWM) 142 mounted on each wheel, and is configured to control to separately apply a regenerative braking torque and/or a driving torque to each of the in-wheel motors mounted on each wheel according to a driving torque command or a regenerative brake torque command of the autonomous driving controller 100.

The autonomous driving controller 100 is configured to determine (determine a collision due to sudden intervening) whether the other vehicle in a next lane suddenly cuts in and whether to secure a safety distance from a rear vehicle based on various types of monitoring information provided from the autonomous driving sensing unit including the camera 11, the navigation 12, the radar 13, the LiDAR 14, or the like while the autonomous driving vehicle is driving in a manual driving mode.

Furthermore, the autonomous driving controller 100 is configured to confirm a lane change space of an autonomous driving vehicle (host vehicle) configured for emergency avoidance of collisions with the other vehicle and surrounding vehicles if it is judged (determined) that the other vehicle suddenly cuts in and judged (determined) that the safety distance from the rear vehicle is not secured based on various types of monitoring information provided from the autonomous driving sensing unit including the camera 11, the navigation 12, the radar 13, the LiDAR 14, or the like while the autonomous driving vehicle is driving in the manual driving mode.

Furthermore, the autonomous driving controller 100 is configured to check the lane change space of the autonomous driving vehicle (host vehicle) capable of urgently avoiding the collisions with the other vehicle and surrounding vehicles, and accordingly, execute rotational steering minimization control and partial braking control of the steering wheel held by the driver as autonomous driving mode transition control so that the lane change to the checked lane change space may be safely performed.

To the present end, the autonomous driving controller 100 is configured to determine an automated steering control amount and a partial control amount for an autonomous driving mode or only a partial control amount according to a steering angle of a steering wheel depending on whether the steering angle or the steering torque of the steering wheel changes by the driver's manual steering operation, the steering direction, and the actual steering angle as a preceding step of the autonomous driving mode transition control.

As an exemplary embodiment of the present disclosure, when there is no change in the steering angle or steering torque of the steering wheel (when there is no manual steering control amount by the driver's manipulation), the autonomous driving controller 100 may determine a first automated steering control amount and a first partial control amount for the autonomous driving mode so that the lane change to the lane change space set as described above may be safely performed, and determine a ratio between the first automated steering control amount and the first partial control amount according to a reflection rate of a preset control amount for lane change.

According to an exemplary embodiment of the present disclosure, the preset control amount for the lane change may be determined as a sum of the first automated steering control amount and the first partial control amount.

Referring to FIG. 5A, when determining the ratio between the first automated steering control amount and the first partial control amount according to an exemplary embodiment of the present disclosure, the ratio may be determined so that only the first partial control amount is reflected at an initial time when the lane change starts according to the reflection rate of the preset control amount for a lane change, and may be determined so that the first automated steering control amount gradually increases with an inclination set to be able to minimize the sense of heterogeneity of the driver, and at the same time, may be determined so that the first partial control amount gradually decreases with the same inclination.

As another exemplary embodiment of the present disclosure, when the steering angle of the steering wheel is generated in the same direction as the lane change direction by the manual steering control amount by the driver's manipulation, the autonomous driving controller 100 may determine a second automated steering control amount and a second partial control amount for the autonomous driving mode so that the lane change to the lane change space set as described above may be safely performed, and determine the ratio between the second automated steering control amount and the second partial control amount to the manual steering control amount by the driver's manipulation according to the reflection rate of the control amount for the lane change.

According to another exemplary embodiment of the present disclosure, the preset control amount for the lane change may be determined as a sum of the manual steering control amount by the driver's manipulation, the second automated steering control amount for the autonomous driving mode, and the second partial control amount.

Figure 6A:
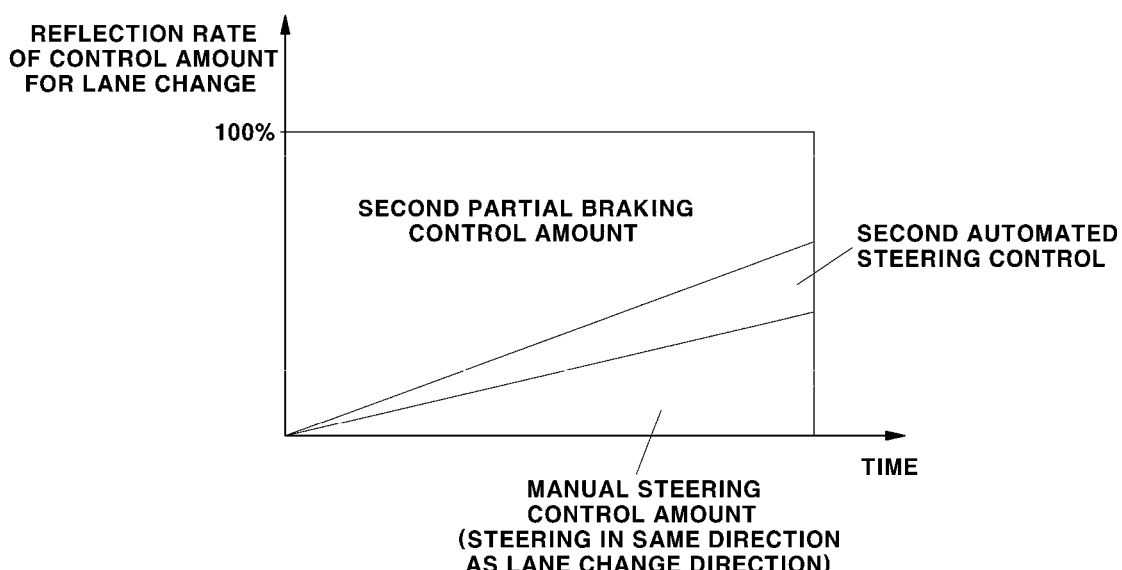
FIG. 6A is a graph illustrating an example in which a reflection rate of a control amount for a lane change in the method for controlling a driving mode transition of an autonomous driving vehicle according to an exemplary embodiment of the present disclosure is determined by a second automated steering control amount and a second partial control amount.
Figure 6B:
FIG. 6B is a schematic diagram illustrating an example in which a lane change is performed under partial braking control according to the second automated steering control amount and the second partial control amount in the method for controlling a driving mode transition of an autonomous driving vehicle according to an exemplary embodiment of the present disclosure.
Figure 6B:
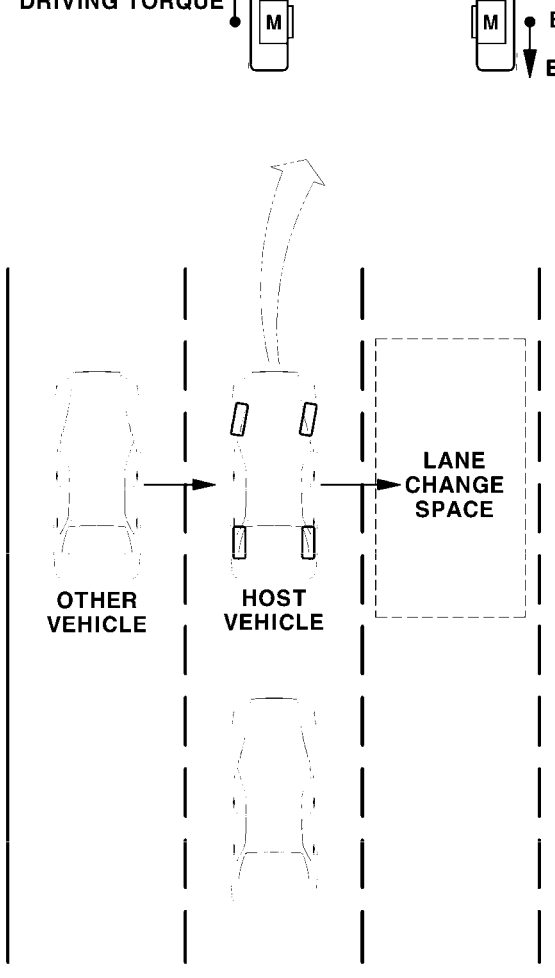

Referring to FIG. 6A, when determining the ratio between the second automated steering control amount and the second partial control amount to the manual steering control amount by the driver's manipulation according to another exemplary embodiment of the present disclosure, the ratio may be determined so that the second automated steering control amount gradually increases with a predetermined inclination set to minimize the sense of heterogeneity of the driver from the initial time to the end time according to the preset control amount for a lane change, and at the same time, may be determined so that the second partial control amount gradually decreases with the same inclination.

When the manual steering control amount by the driver's manipulation is greater than the steering control amount required for the lane change, the autonomous driving controller is configured to determine a reverse partial control amount so that the lane change to the lane change space set as described above may be safely performed.

As another exemplary embodiment of the present disclosure, when the steering angle of the steering wheel is generated in the opposite direction to the lane change direction according to the manual steering control amount by the driver's manipulation, the autonomous driving controller 100 determines only a third partial control amount for the autonomous driving mode so that the lane change to the lane change space set as described above may be safely performed and determines to increase the reflection rate of the partial control amount by the manual steering control amount (the manual steering control amount in the opposite direction to the lane change direction) by the driver's manipulation.

In the instant case, when the steering angle of the steering wheel is generated in the opposite direction to the lane change direction by the manual steering control amount by the driver's manipulation, the amount of automated steering control by the autonomous driving mode required for the lane change is inevitably increased significantly, and accordingly, as the rotational steering angle of the steering wheel is greatly generated by the increased automated steering control amount, a driver expect the breakdown of the vehicle, etc., and may be greatly embarrassed, and the driver may feel a great sense of heterogeneity and may injure joints such as a wrists or elbows.

Figure 7A:
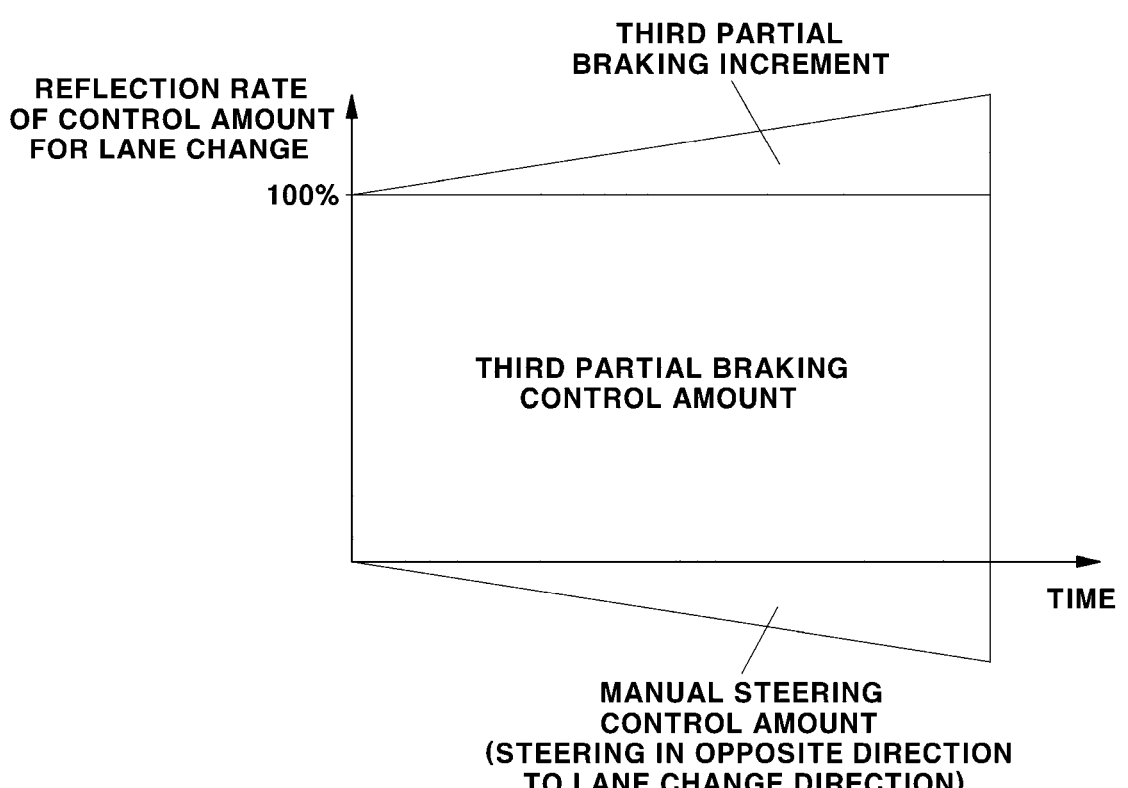
FIG. 7A is a graph illustrating an example in which a reflection rate of a control amount for a lane change in the method for controlling a driving mode transition of an autonomous driving vehicle according to an exemplary embodiment of the present disclosure is determined only by a third partial control amount.

Accordingly, when the steering angle of the steering wheel is generated in the opposite direction to the lane change direction by the manual steering control amount by the driver's manipulation, as illustrated in FIG. 7A, the autonomous driving controller 100 determines the preset control amount for the lane change only with the third partial control amount for the autonomous driving mode, and determines to increase the reflection rate of the partial control amount by the manual steering control amount by the driver's manipulation so that the steering angle of the steering wheel is generated in the opposite direction to the lane change direction.

As a result, according to another exemplary embodiment of the present disclosure, the preset control amount for the lane change is determined only by the third partial control amount, and the third partial control amount may be determined as including the increment in the partial control amount by the manual steering control amount (manual steering control amount in the opposite direction to the lane change direction) by the driver's manipulation.

As described above, the automated steering control amount determined in various exemplary embodiments are commanded from the autonomous driving controller 100 to the steering controller 110, so that the steering controller 110 may execute the steering control of the steering wheel according to the automated steering control amount.

Furthermore, the partial control amount determined in various exemplary embodiments as described above is commanded from the autonomous driving controller 100 to the motor controller 140 and the brake controller 130, and so, to satisfy the partial control amount, the motor controller 140 may execute the regenerative braking control for the in-wheel motor or execute the regenerative braking control for an in-wheel motor 142, and at the same time, the brake controller 130 may execute hydraulic braking control for a hydraulic brake 132.

Here, the method for controlling a driving mode transition of an autonomous driving vehicle of the present disclosure based on the system configuration described above will be described in order as follows.

Figure 3A:
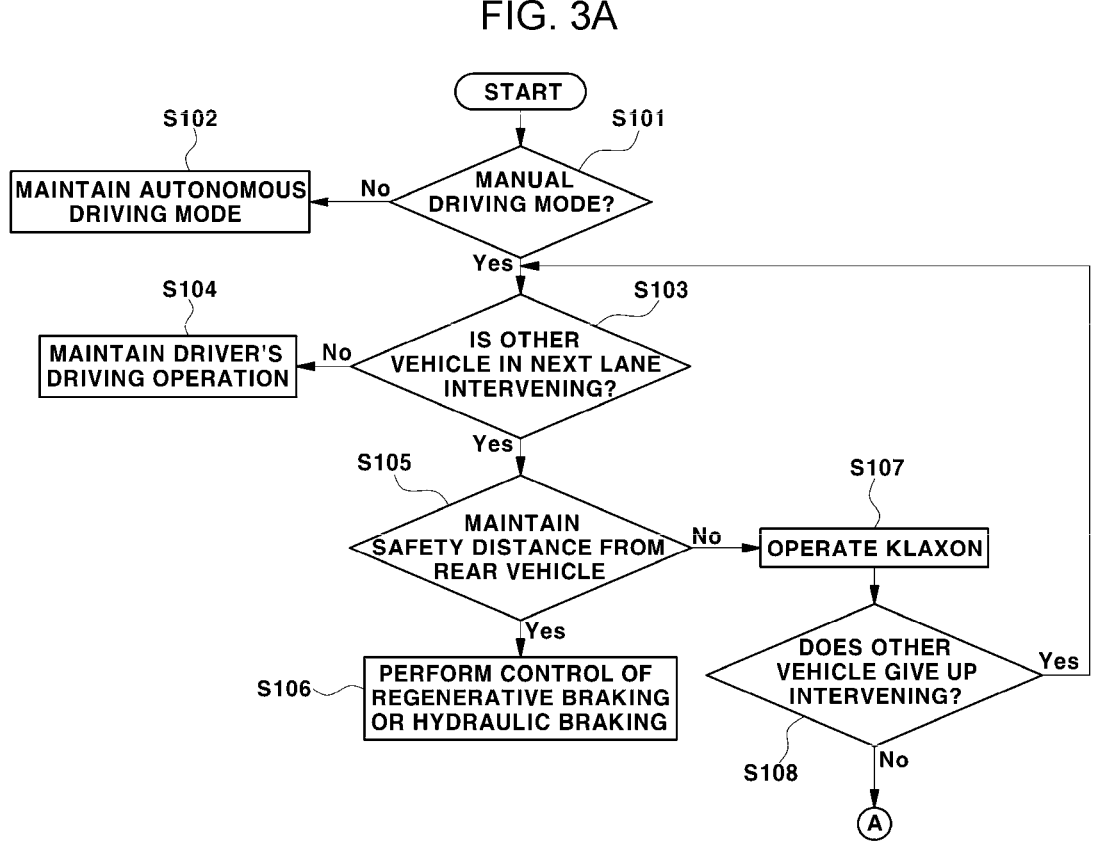
FIG. 3A and FIG. 3B are flowcharts illustrating a method for controlling a driving mode transition of an autonomous driving vehicle according to an exemplary embodiment of the present disclosure.
Figure 3B:
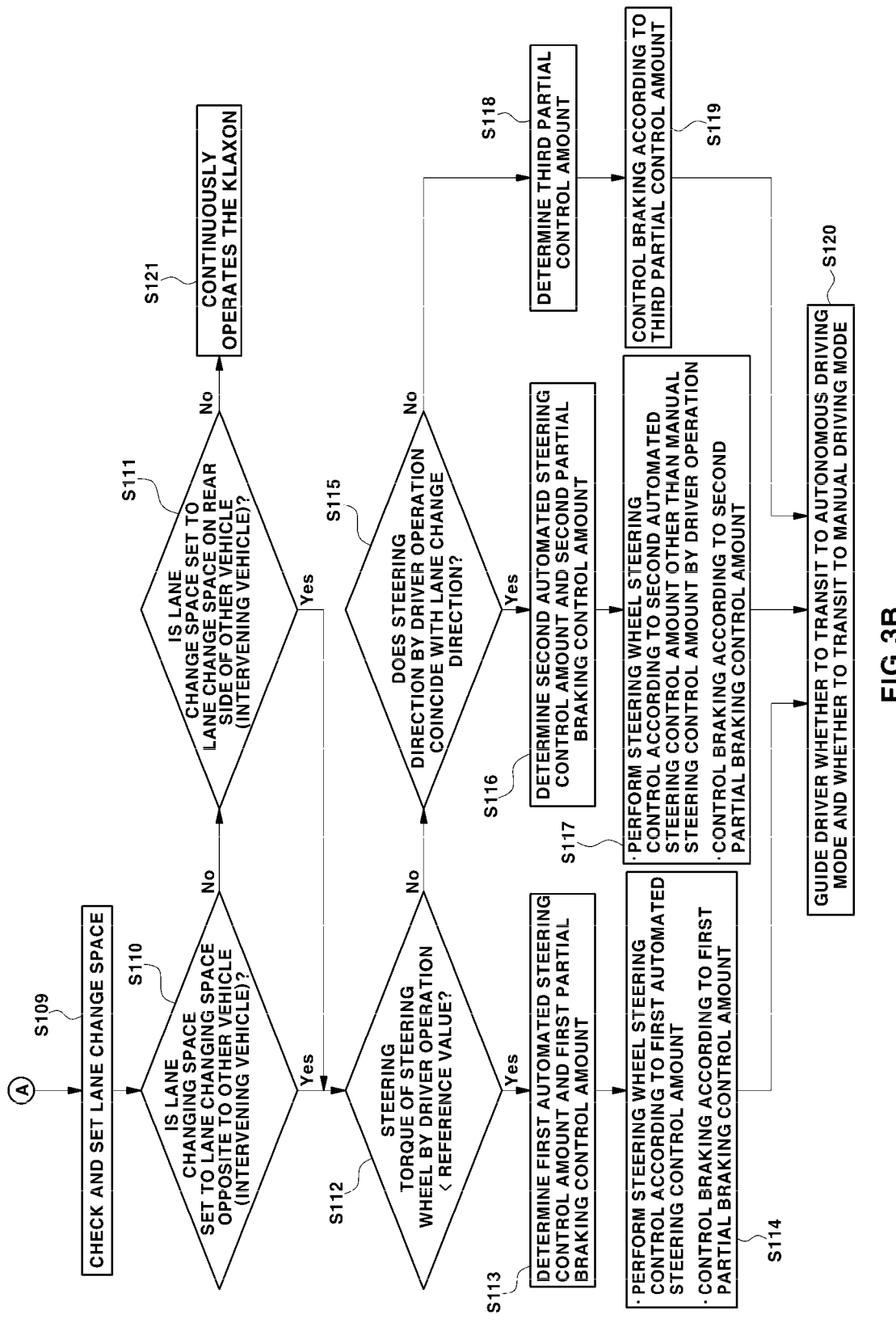

FIG. 3A and FIG. 3B are flowcharts illustrating a method for controlling a driving mode transition of an autonomous driving vehicle according to an exemplary embodiment of the present disclosure.

First, it is checked whether the current driving mode of the autonomous driving vehicle is a manual driving mode (S101).

For example, according to the selection operation of the manual driving mode or the autonomous driving mode of the driving mode select switch 120, the autonomous driving controller 100 may check whether the current driving mode is the manual driving mode or the autonomous driving mode.

As a result of checking in step S101, if the current driving mode is not the manual driving mode but the autonomous driving mode, the autonomous driving mode is maintained as it is (S102), whereas if the current driving mode is in the manual driving mode, it is determined whether the other vehicle in the next lane cuts in (S103).

For example, the autonomous driving controller 100 may determine whether the other vehicle in the next line cuts in by determining a distance from the other vehicle, an approach speed of the other vehicle, etc., based on various types of monitoring information provided from the autonomous driving sensing unit including the camera 11, the navigation 12, the radar 13, the LiDAR 14, or the like while driving in a manual driving mode.

As the determination result in step S103, if it is determined that there is no intervening of the other vehicle, the driver's driving operation is maintained in the manual driving mode state (S104), whereas if it is determined that there is the intervening of the other vehicle, it is determined whether the safety distance from the rear vehicle is maintained (S105).

For example, the autonomous driving controller 100 may determine whether the safety distance from the rear vehicle is maintained based on various types of monitoring information provided from the autonomous driving sensing unit including the camera 11, the navigation 12, the radar 13, the LiDAR 14, or the like while driving in the manual driving mode.

As the determination result in step S105, if it is determined that the safety distance from the rear vehicle is secured, the regenerative braking or hydraulic braking control is performed to allow the other vehicle to intervene and to avoid the collision with the other vehicle (S106).

For example, when the autonomous driving controller 100 commands the regenerative braking amount to the motor controller 140 or the hydraulic braking amount to the brake controller 130 in the state in which the brake pedal operation by the driver is not checked, the motor controller 140 performs the regenerative braking control on the in-wheel motor or the brake controller 130 performs the hydraulic braking control on the hydraulic brake, so that the regenerative or hydraulic braking may be performed to avoid the collision with the other vehicle while allowing the other vehicle to intervene.

Of course, a driver directly checks that the other vehicle in the next lane cuts in and checks the safety distance from the rear vehicle, so, when the driver directly operates the brake pedal, the collision with the other vehicle may be avoided as the intervening of the other vehicle is allowed along with the braking of the autonomous driving vehicle (host vehicle)

As the determination result in step S105, if it is determined that the safety distance from the rear vehicle is not secured, first, the autonomous driving controller 100 operates a klaxon to warn that the risk of collision may occur when the other vehicle cuts in (S107).

As a result of the operation of the klaxon, it is determined whether the other vehicle gives up intervening (S108).

For example, the autonomous driving controller 100 may determine whether the other vehicle in the next line gives up intervening or continuously cuts in by determining the distance from the autonomous driving vehicle (host vehicle) and the other vehicle, the approach speed of the other vehicle, etc., based on various types of monitoring information provided from the autonomous driving sensing unit including the camera 11, the navigation 12, the radar 13, the LiDAR 14, or the like while driving in a manual driving mode.

As a result of the confirmation in step S108, if it is determined that the intervening of the other vehicle continues, the lane change space of the autonomous driving vehicle (host vehicle) which may urgently avoid the collision with the other vehicle and the surrounding vehicles is checked and set (S109).

In the instant case, the autonomous driving controller 100 may be check and set the lane change space of the autonomous driving vehicle (host vehicle) capable of urgently avoiding the other vehicle and the surrounding vehicles based on various types of monitoring information provided from the autonomous driving sensing unit including the camera 11, the navigation 12, the radar 13, the LiDAR 14, or the like while the autonomous driving vehicle is driving in the manual driving mode.

Figure 4A:
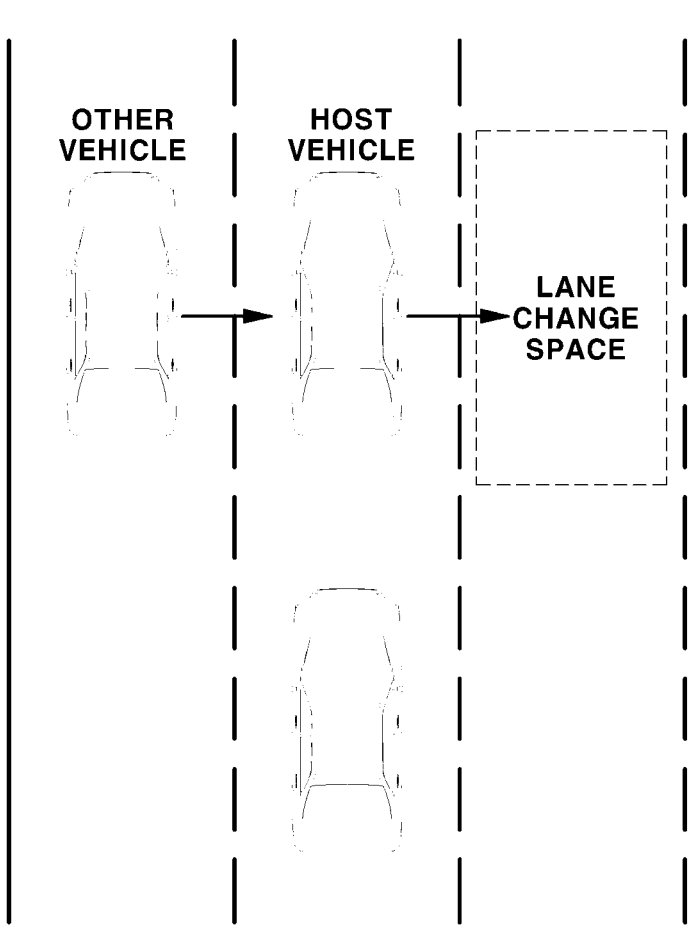
FIG. 4A, FIG. 4B and FIG. 4C are schematic diagrams illustrating an example of checking a lane change space in the method for controlling a driving mode transition of an autonomous driving vehicle according to an exemplary embodiment of the present disclosure.
Figure 4B:
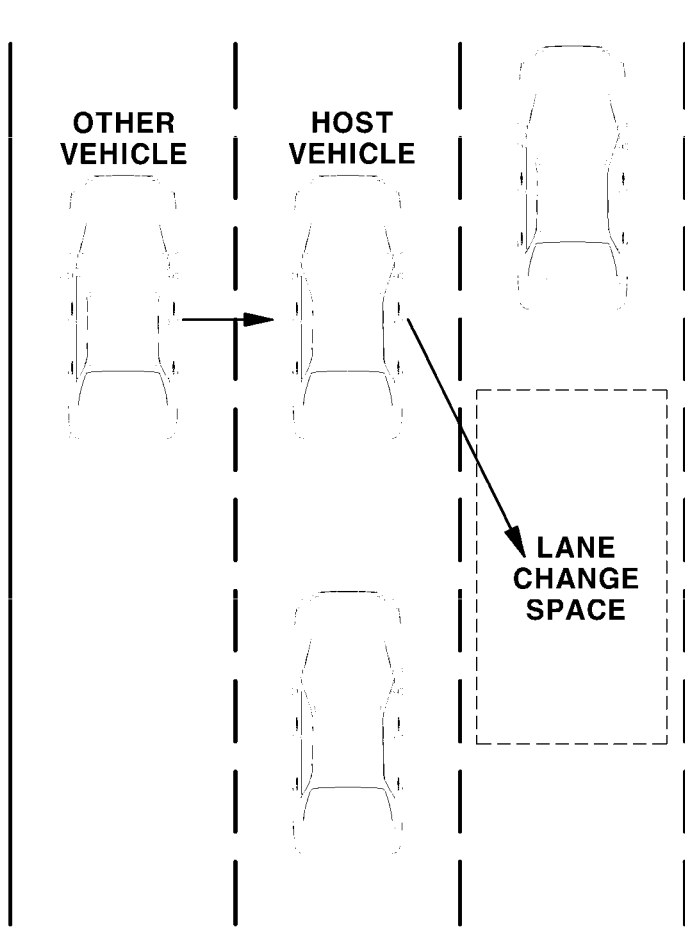
Figure 4C:
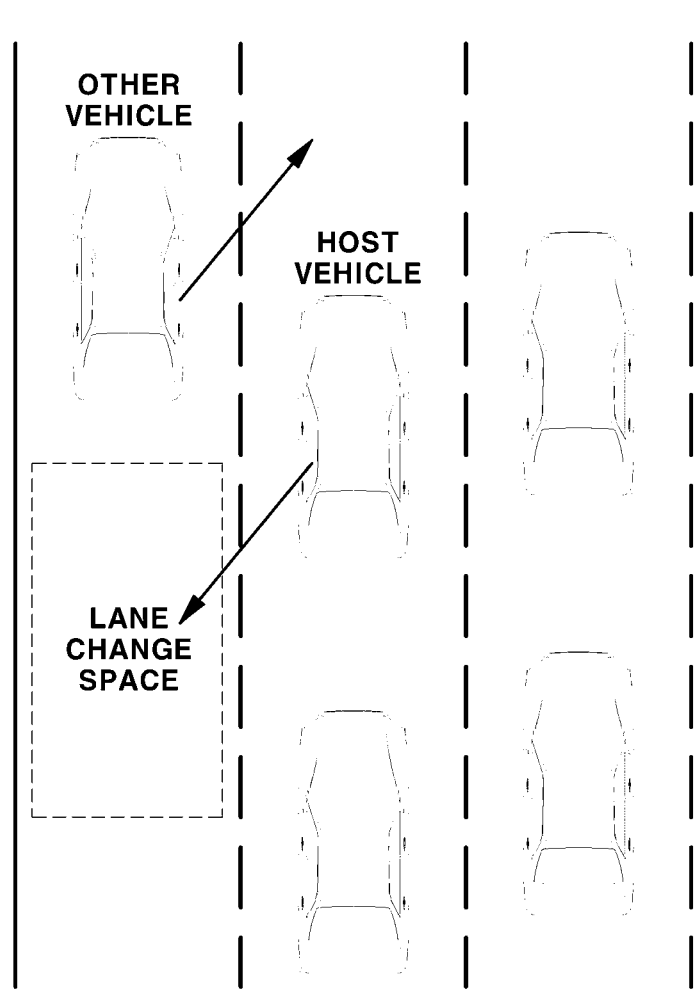

For example, as illustrated in FIG. 4A and FIG. 4B, the lane change space of the autonomous driving vehicle (host vehicle) capable of urgently avoiding the collision with the other vehicle and the surrounding vehicles may be set as the lane change space on the opposite side to the other vehicle (intervening vehicle), or as illustrated in FIG. 4C, the lane change space of the autonomous driving vehicle (host vehicle) may be set as the lane change space on a rear side of the other vehicle (intervening vehicle).

As a result of the checking in step S109, when it is determined that the lane change space of the autonomous driving vehicle (host vehicle) capable of urgently avoiding the collision with the other vehicle and the surrounding vehicles is determined as being set to the lane change space on the opposite side to the other vehicle (intervening vehicle) (S110) or determined as being set to the lane change space on the rear side of the other vehicle (intervening vehicle) (S111), the autonomous driving controller 100 performs the rotational steering minimization control and the partial braking control of the steering wheel held by the driver together with the autonomous driving mode transition control so that a lane change to a set lane change space may be safely made.

To the present end, first, the autonomous driving controller 100 determines whether the steering torque of the steering wheel changes by the driver's manipulation (S112).

For example, the autonomous driving controller 100 may determine whether the steering torque of the steering wheel changes based on the detection signal of the torque sensor 112 provided from the steering controller 110, but when the steering torque of the steering wheel is less than a reference value, may determine that there is no change in the steering torque of the steering wheel by the driver's manipulation and when the steering torque of the steering wheel is the reference value or greater, may determine that there is no change in the steering torque of the steering wheel by the driver's manipulation.

As the determination result in step S112, if it is determined that there is no change in the steering torque of the steering wheel by the driver's manipulation, that is, if the steering torque of the steering wheel is less than the reference value, by considering that the driver is not steering the steering wheel without recognizing the interruption of the other vehicle, the first automated steering control amount and the first partial control amount for the autonomous driving mode are determined so that the lane change to the lane change space (lane change space on the opposite side or rear side of the other vehicle) as described above may be safely made (S113).

Referring to FIG. 5A, when there is no change in the steering angle or steering torque of the steering wheel (when there is no manual steering control amount by the driver's manipulation), the autonomous driving controller 100 may determine the first automated steering control amount and the first partial control amount for the autonomous driving mode so that the lane change to the lane change space set as described above may be safely performed and determine the ratio between the first automated steering control amount and the first partial control amount according to the reflection rate of the preset control amount for a lane change, and the preset control amount for the lane change may be determined as the sum of the first automated steering control amount and the first partial control amount.

When determining the ratio between the first automated steering control amount and the first partial control amount according to an exemplary embodiment of the present disclosure, the ratio may be determined so that only the first partial control amount is reflected at an initial time when the lane change starts according to the reflection rate of the preset control amount for a lane change, and may be determined so that the first automated steering control amount gradually increases with an inclination set to be able to minimize the sense of heterogeneity of the driver, and at the same time, may be determined so that the first partial control amount gradually decreases with the same inclination.

Subsequently, the first automated steering control amount determined as above is commanded from the autonomous driving controller 100 to the steering controller 110, and the first partial control amount is commanded from the autonomous driving controller 100 to the motor controller 140 or the brake controller 130, so that the steering wheel steering control according to the first automated steering control amount and the partial braking control according to the first partial control amount are performed in the transition state to the autonomous driving mode (S114).

Figure 5B:
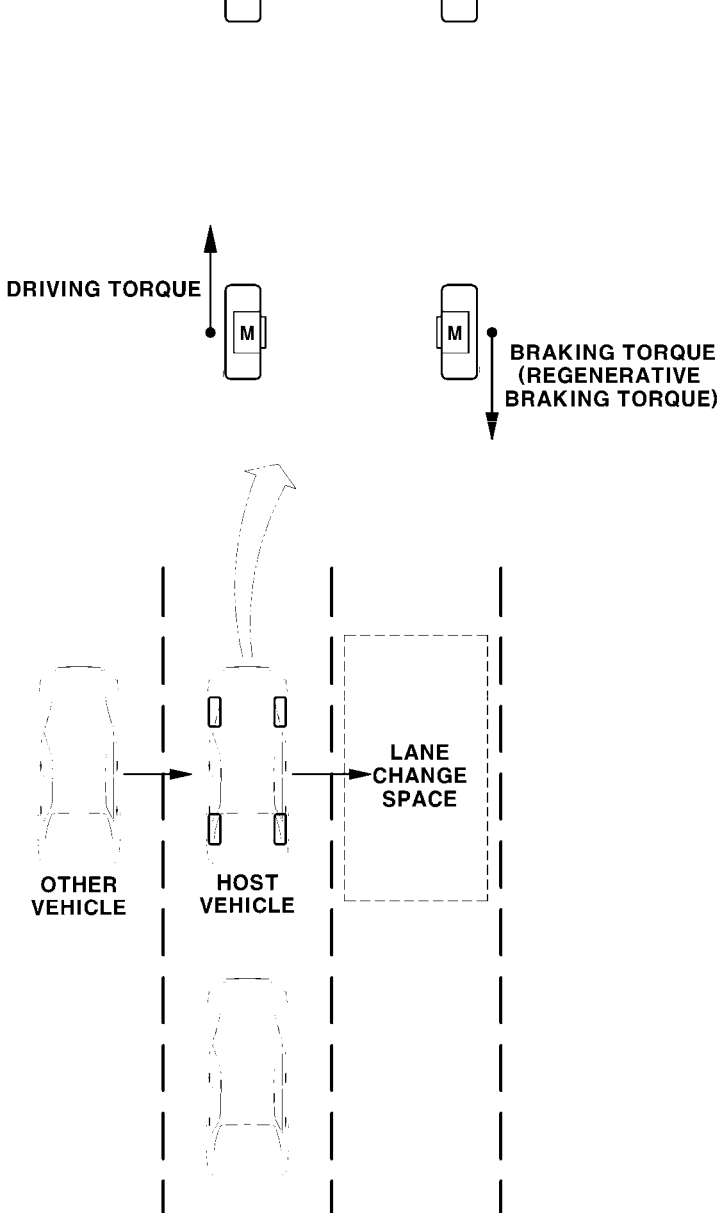
FIG. 5B is a schematic diagram illustrating an example in which a lane change is performed under partial braking control according to the first automated steering control amount and the first partial control amount in the method for controlling a driving mode transition of an autonomous driving vehicle according to an exemplary embodiment of the present disclosure.

For example, as illustrated in FIG. 5B, by executing the steering wheel steering control according to the first automated steering control amount in the steering controller 110, the steering wheel is automatically steered in the direction of the lane change space set in step S110 (for example, the lane change space on the other side of the other vehicle) by the first automated steering control amount, and at the same time, the motor controller 140 executes the partial braking control that applies the driving torque to the in-wheel motor mounted on the left wheel in the opposite direction to the lane change direction and applies the regenerative braking torque according to the first partial control amount to the in-wheel motor mounted on the right wheel in the lane change direction, so that the lane change of the autonomous driving vehicle (host vehicle) to the lane change space set in step S110 (e.g., the lane change space on the opposite side to the other vehicle) may be safely performed.

Alternatively, by executing the steering wheel steering control according to the first automated steering control amount in the steering controller 110, the steering wheel is automatically steered in the direction of the lane change space set in step S111 (for example, the lane change space on the rear side of the other vehicle) by the first automated steering control amount, and at the same time, the motor controller 140 executes the partial braking control that applies the driving torque to the in-wheel motor mounted on the right wheel in the opposite direction to the lane change direction and applies the regenerative braking torque according to the first partial control amount to the in-wheel motor mounted on the right wheel in the lane change direction, so that the lane change of the autonomous driving vehicle (host vehicle) to the lane change space set in step S111 (e.g., the lane change space on the rear side to the other vehicle) may be safely performed.

In the present way, the lane change of the autonomous driving vehicle (host vehicle) to the previously checked lane change space is safely performed based on the steering wheel steering control according to the first automated steering control amount and the partial braking control according to the first partial control amount, so that the collision with the other vehicle may be easily avoided.

Furthermore, by use of the partial braking control according to the first partial control amount for the lane change for the collision avoidance, it is possible to minimize the automatic rotational steering angle of the steering wheel held by the driver, and accordingly, it is possible to prevent injuries to joints such as driver's wrists and elbows while minimizing the sense of heterogeneity of the driver holding the steering wheel.

Meanwhile, as the determination result in step S112, if it is determined that there is a change in the steering torque of the steering wheel by the driver's manipulation, that is, if the steering torque of the steering wheel by the driver's manipulation is the reference value or greater, it is determined whether the steering direction of the steering wheel by the driver's manipulation coincides with the lane change direction to the lane change space (lane change space on the opposite side or the rear side of the other vehicle) set in steps S110 and S111 (S115).

For example, the autonomous driving controller 100 may determine whether the steering angle and the steering direction of the steering wheel coincide with the lane change direction to the lane change space (lane change space on the opposite side or the rear side of the other vehicle) based on the detection signal of the steering angle sensor 11I provided from the steering controller 110.

As the determination result in step S115, if it is determined that the steering direction of the steering wheel by the driver's manipulation coincides with the lane change direction to the lane change space (lane change space on the opposite side or the rear side of the other vehicle) set in steps S110 and S111, the second automated steering control amount and the second partial control amount for the autonomous driving mode is determined so that the lane change to the lane change space (lane change space on the opposite side or the rear side of the other vehicle) may be safely performed (S116).

Referring to FIG. 6A, when the steering angle of the steering wheel is generated in the same direction as the lane change direction by the manual steering control amount by the driver's manipulation, the autonomous driving controller 100 may determine the second automated steering control amount and the second partial control amount for the autonomous driving mode so that the lane change to the lane change space set as described above may be safely performed, and determine the ratio between the second automated steering control amount and the second partial control amount to the manual steering control amount by the driver's manipulation according to the reflection rate of the preset control amount for a lane change, and the preset control amount for the lane change may be determined as the sum of the manual steering control amount by the driver's manipulation, the second automated steering control amount for the autonomous driving mode and the second partial control amount.

When determining the ratio between the second automated steering control amount and the second partial control amount to the manual steering control amount by the driver's manipulation, the ratio may be determined so that the second automated steering control amount gradually increases with a predetermined inclination set to minimize the sense of heterogeneity of the driver from the initial time to the end time according to the preset control amount for a lane change, and at the same time, may be determined so that the second partial control amount gradually decreases with the same inclination.

Subsequently, the first automated steering control amount determined as above is commanded from the autonomous driving controller 100 to the steering controller 110, and the first partial control amount is commanded from the autonomous driving controller 100 to the motor controller 140 or the brake controller 130, so that the steering wheel steering control according to the first automated steering control amount and the partial braking control according to the first partial control amount are performed in the transition state to the autonomous driving mode (S114).

For example, as illustrated in FIG. 5B, by executing the steering wheel steering control according to the first automated steering control amount in the steering controller 110, the steering wheel is automatically steered in the direction of the lane change space set in step S110 (for example, the lane change space on the other side of the other vehicle) by the first automated steering control amount, and at the same time, the motor controller 140 executes the partial braking control that applies the driving torque to the in-wheel motor mounted on the left wheel in the opposite direction to the lane change direction and applies the regenerative braking torque according to the first partial control amount to the in-wheel motor mounted on the right wheel in the lane change direction, so that the lane change of the autonomous driving vehicle (host vehicle) to the lane change space set in step S110 (e.g., the lane change space on the opposite side to the other vehicle) may be safely performed.

For example, as illustrated in FIG. 5B, by executing the steering wheel steering control according to the first automated steering control amount in the steering controller 110, the steering wheel is automatically steered in the direction of the lane change space set in step S110 (for example, the lane change space on the other side of the other vehicle) by the first automated steering control amount, and at the same time, the motor controller 140 executes the partial braking control that applies the driving torque to the in-wheel motor mounted on the left wheel in the opposite direction to the lane change direction and applies the regenerative braking torque according to the first partial control amount to the in-wheel motor mounted on the right wheel in the lane change direction, so that the lane change of the autonomous driving vehicle (host vehicle) to the lane change space set in step S110 (e.g., the lane change space on the opposite side to the other vehicle) may be safely performed.

In the present way, the lane change of the autonomous driving vehicle (host vehicle) to the previously checked lane change space is safely performed based on the steering wheel steering control according to the second automated steering control amount and the partial braking control according to the second partial control amount, so that the collision with the other vehicle may be easily avoided.

Furthermore, by use of the partial braking control according to the second partial control amount for the lane change for the collision avoidance, it is possible to minimize the automatic rotational steering angle of the steering wheel in addition to the manual steering of the steering wheel by the driver, and accordingly, it is possible to prevent injuries to joints such as driver's wrists and elbows while minimizing the sense of heterogeneity of the driver holding the steering wheel.

Meanwhile, as the determination result in step S115, if it is determined that the steering direction of the steering wheel by the driver's manipulation is an opposite direction to the lane change direction to the lane change space (lane change space on the opposite side or the rear side of the other vehicle) set in steps S110 and S111, the second automated steering control amount and the second partial control amount for the autonomous driving mode is determined so that the lane change to the lane change space (lane change space on the opposite side or the rear side of the other vehicle) may be safely performed (S118).

In the instant case, when the steering angle of the steering wheel is generated in the opposite direction to the lane change direction by the manual steering control amount by the driver's manipulation, the amount of automated steering control by the autonomous driving mode required for the lane change is inevitably increased significantly, and accordingly, as the rotational steering angle of the steering wheel is greatly generated by the increased automated steering control amount, a driver expect the breakdown of the vehicle, etc., and may be greatly embarrassed, and the driver may feel a great sense of heterogeneity and may injure joints such as a wrists or elbows.

Therefore, when the steering angle of the steering wheel is generated in the opposite direction to the lane change direction according to the manual steering control amount by the driver's manipulation, the autonomous driving controller 100 determines only a third partial control amount for the autonomous driving mode so that the lane change to the lane change space set as described above may be safely performed and determines to increase the reflection rate of the partial control amount by the manual steering control amount (the manual steering control amount in the opposite direction to the lane change direction) by the driver's manipulation.

In other words, when the steering angle of the steering wheel is generated in the opposite direction to the lane change direction by the manual steering control amount by the driver's manipulation, as illustrated in FIG. 7A, the autonomous driving controller 100 may determine the preset control amount for the lane change based on only the third partial control amount for the present autonomous driving mode, and in the instant case, the third partial control amount may be determined as including the increment in the partial control amount corresponding to the manual steering control amount (manual steering control amount in the opposite direction to the lane change direction) by the driver's manipulation.

As a result, the third partial control amount includes an increment in the partial control amount corresponding to the manual steering control amount in the opposite direction to the lane change direction by the driver's manipulation, and thus, may be determined to be equal to the preset control amount for the lane change.

Subsequently, while the third partial control amount determined as above is commanded from the autonomous driving controller 100 to the motor controller 140 and the brake controller 130, and the partial braking control according to the third partial control amount is performed in the state of transitioning to the autonomous driving mode (S119).

In other words, in a state where the steering angle of the steering wheel is generated in the opposite direction to the lane change direction by the manual steering control amount by the driver's manipulation, the partial braking control is performed according to the third partial control amount determined as a control amount greater than the first partial control amount and the second partial control amount while excluding the automated steering control for the steering wheel to prevent the sense of heterogeneity of the driver and the injury to the driver.

Figure 7B:
FIG. 7B is a schematic diagram illustrating an example in which a lane change is performed under partial braking control according to the third partial control amount in the method for controlling a driving mode transition of an autonomous driving vehicle according to an exemplary embodiment of the present disclosure.
Figure 7B:
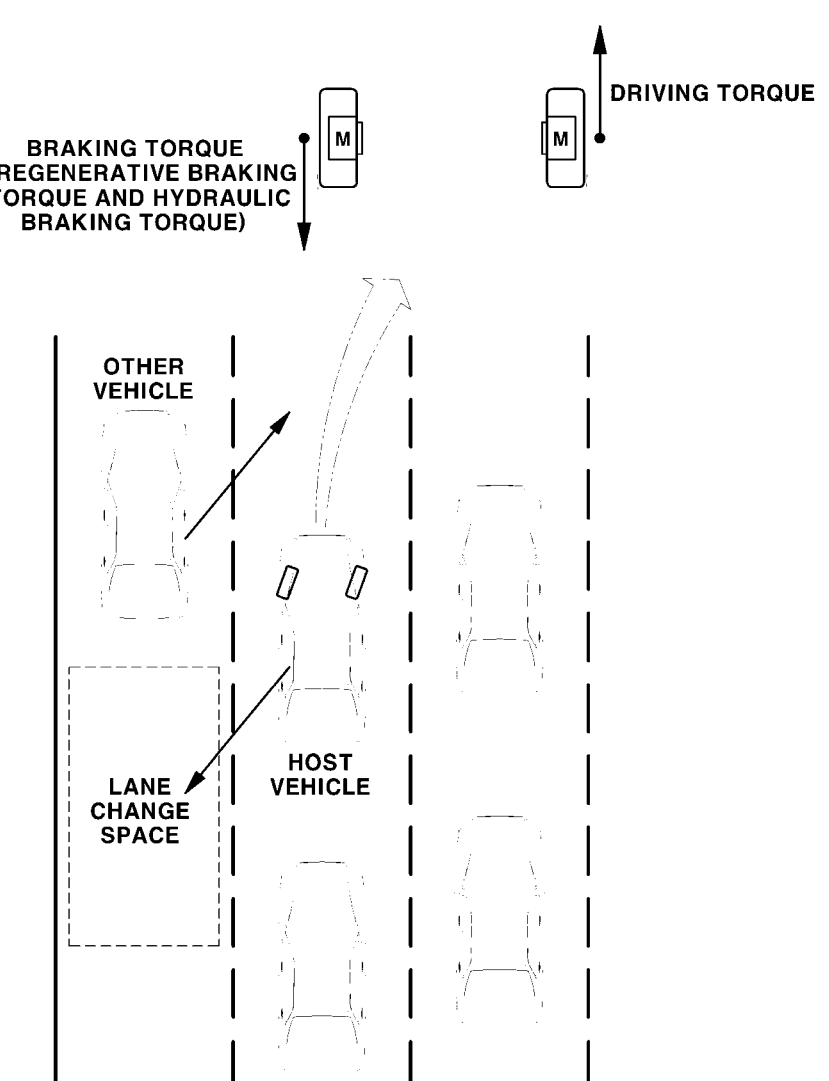

For example, as illustrated in FIG. 7B, in the state in which the steering wheel is steered to the right opposite to the lane change space (e.g., the lane change space on the rear side of the other vehicle on the left side) set in step S111 by the manual steering control amount by the driver's manipulation, to satisfy the third partial control amount, the motor controller 140 applies the driving torque to the in-wheel motor 142 mounted on the right wheel opposite to the lane change direction and applies the regenerative braking torque to the in-wheel motor 142 mounted on the left wheel opposite to the lane change direction, and at the same time, the brake controller 130 performs the partial braking control that applies the hydraulic braking torque to the hydraulic brake 142 mounted on the left wheel which is the lane change direction, so that the lane change of the autonomous driving vehicle (host vehicle) to the lane change space (e.g., lane change space on the rear side of the other vehicle) set in step S111 may be safely performed.

In the present way, when the steering wheel steering direction by the driver's manipulation is opposite to the lane changing direction, the lane change of the autonomous driving vehicle (driving vehicle) to the previously checked lane change space is safely performed only by the partial braking control according to the third partial control including the regenerative braking torque of the in-wheel motor and the hydraulic braking torque of the hydraulic brake while excluding the automated steering control for the steering wheel, so it is possible to easily avoid the collision with the other vehicle and prevent the sense of heterogeneity of the driver and the injury to the joints of the driver holding the steering wheel.

After the partial braking control according to the first automated steering control amount and the first partial control amount in the above step S114 is performed in the state of transitioning to the autonomous driving mode, after the partial braking control according to the second automated steering control amount and the second partial control amount is performed in the state of transitioning to the autonomous driving mode in the above step S117, and after partial braking control according to the third partial control amount is performed in the state of transitioning to the autonomous driving mode in the above step S119, it is possible to guide the driver whether to transit to the autonomous driving mode and whether to transit to the manual driving mode (S120).

For example, after the above steps S114, S117, and S119 end, the autonomous driving controller 100 may perform control to visually display or audibly notify a guide message indicating whether to transit to the autonomous driving mode and whether to transit to the manual driving mode through an in-vehicle cluster or a display, so that the driver may determine whether to transit back to the manual driving mode.

Meanwhile, when as the determination result in the step S110, it is determined that the lane change space on the opposite side to the other vehicle (intervening vehicle) is not secured, and as the determination result in the step S111, it is determined that the lane change space on the rear side of the other vehicle (intervening vehicle) is not secured, that is, if it is not possible to check and set the lane change space which may avoid the collision with the other vehicle, the autonomous driving controller 100 determines that there is no lane change space for collision avoidance with the other vehicle, and continuously operates the klaxon for the collision avoidance with the other vehicle and the warning (S121).

Through the means for solving the above problems, the present disclosure provides the following effects.

First, when the other vehicle in the next lane suddenly cuts in while the autonomous driving vehicle is driving in the manual driving mode, by performing the partial control while minimizing the rotational steering of the steering wheel by the transition control of the autonomous driving mode, it is possible to safely perform the lane change to avoid the collision with the other vehicle.

Second, even if the other vehicle in the next lane suddenly cuts in while the autonomous driving vehicle is driving in the manual driving mode, by minimizing the rotational steering of the steering wheel with partial braking for the lane change to avoid a collision, it is possible to minimize the sense of heterogeneity of the driver holding the steering wheel and prevent injuries to joints such as driver's wrists and elbows.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the scope of the present disclosure includes software or machine-executable commands (e.g., an operating system, an application, firmware, a program, etc.) for facilitating operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A method for controlling a driving mode transition of an autonomous driving vehicle, the method comprising:

checking, by an autonomous driving controller, whether a current driving mode of the autonomous driving vehicle is a manual driving mode;

determining, by the autonomous driving controller, whether there is a cut-in vehicle in an adjacent lane;

determining, by the autonomous driving controller, whether to maintain a safety distance from a rear vehicle when the autonomous driving controller concludes that there is the cut-in vehicle;

checking and setting, by the autonomous driving controller, a lane change space in which a collision with the cut-in vehicle is avoided when the autonomous driving controller concludes that the safety distance from the rear vehicle is not secured; and executing, by the autonomous driving controller, a rotational steering control of a steering wheel and a partial braking control while switching to an autonomous driving mode from the manual driving mode of the autonomous driving vehicle to move into the set lane change space wherein, when the other vehicle in the adjacent lane cuts in while the autonomous driving vehicle is driving in the manual driving mode, the transition from the manual driving mode to the autonomous driving mode is performed to safely perform the lane change to avoid the collision with the other vehicle, wherein the performing of the rotational steering control of the steering wheel and the partial braking control include;

determining an automated steering control amount and a partial control amount for the autonomous driving mode when a steering torque of the steering wheel is less than a reference value, wherein, when determining a ratio between the automated steering control amount and the partial control amount, the ratio is determined so that only the partial control amount is reflected at an initial time when the lane change starts according to a reflection rate of a preset control amount for the lane change, and is determined so that the automated steering control amount increases with a predetermined inclination from the initial time to a time when the lane change ends, and at a same time, is determined so that the partial control amount decreases with a same inclination thereof.

2. The method of claim 1, wherein, when the autonomous driving controller concludes that the safety distance from the rear vehicle is secured, the autonomous driving controller is configured to perform regenerative braking control or hydraulic braking control to avoid the collision with the cut-in vehicle.

3. The method of claim 1, further including:

honking, by the autonomous driving controller, a horn to warn the cut-in vehicle that a risk of collision occurs when another vehicle cuts in when the autonomous driving controller concludes that the safety distance from the rear vehicle is not secured.

4. The method of claim 1, wherein the lane change space in which a collision with another vehicle is avoided is set as a lane change space opposite to the another vehicle or a lane change space on a rear side of the another vehicle.

5. The method of claim 1, wherein the performing of the rotational steering control of the steering wheel and the partial braking control include:

determining whether the steering torque of the steering wheel changes by a driver's manipulation;

determining a first automated steering control amount and a first partial control amount for the autonomous driving mode when the steering torque of the steering wheel is less than a reference value; and performing steering wheel steering control according to the first automated steering control amount and the partial braking control according to the first partial control amount to change a lane to the set lane change space.

6. The method of claim 5, wherein a ratio between the first automated steering control amount and the first partial control amount is determined according to a reflection rate of a preset control amount for a lane change, and the preset control amount for the lane change is a sum of the first automated steering control amount and the first partial control amount.

7. The method of claim 5, wherein automated steering is performed in a lane change space direction in which the steering wheel is set by the first automated steering control amount through the steering wheel steering control, wherein a driving torque is applied to an in-wheel motor in a wheel of the vehicle on an opposite side of the vehicle from the lane change by the partial braking control according to the first partial control amount, and wherein a regenerative braking torque according to the first partial control amount is applied to the in-wheel motor in the wheel on the same side of the vehicle as the lane change.

8. The method of claim 1, wherein the performing of the rotational steering control of the steering wheel and the partial braking control include:

determining whether the steering torque of the steering wheel changes by a driver's manipulation;

determining whether a steering direction of the steering wheel by the driver's manipulation coincides with a lane change direction to the set lane change space when the steering torque of the steering wheel is a reference value or greater than the reference value;

determining a second automated steering control amount and a second partial control amount for the autonomous driving mode when the autonomous driving controller concludes that the steering direction of the steering wheel by the driver's manipulation coincides with the lane change direction to the set lane change space; and performing steering wheel steering control according to the second automated steering control amount and the partial braking control according to the second partial control amount to change a lane to the set lane change space.

9. The method of claim 8, wherein a ratio between the second automated steering control amount and the second partial control amount is determined according to a reflection rate of a preset control amount for a lane change, and wherein the preset control amount for the lane change is a sum of a manual steering control amount by the driver's manipulation, the second automated steering control amount, and the second partial control amount.

10. The method of claim 9, wherein, when determining the ratio between the second automated steering control amount and the second partial control amount to the manual steering control amount by the driver's manipulation, the ratio is determined so that the second automated steering control amount increases with a predetermined inclination from an initial time to an end time of the lane change according to the reflection rate of the preset control amount for the lane change, and at a same time, is determined so that the second partial control amount decreases with a same inclination thereof.

11. The method of claim 8, wherein automated steering is performed in a lane change space direction in which the steering wheel is set by the second automated steering control amount in addition to a manual steering control amount by the driver's manipulation through the steering wheel steering control, and wherein a driving torque is applied to an in-wheel motor in a wheel of the vehicle on the opposite side of the vehicle from the lane change by the partial braking control according to the second partial control amount, and wherein a regenerative braking torque according to the first partial control amount is applied to the in-wheel motor in the wheel on the same side of the vehicle as the lane change.

12. The method of claim 1, wherein the performing of the rotational steering control of the steering wheel and the partial braking control include:

determining whether the steering torque of the steering wheel changes by a driver's manipulation;

determining whether a steering direction of the steering wheel by the driver's manipulation coincides with a lane change direction to the set lane change space when the steering torque of the steering wheel is a reference value or greater than the reference value;

determining a third partial control amount for the autonomous driving mode when the autonomous driving controller concludes that the steering direction of the steering wheel by the driver's manipulation is opposite to the lane change direction to the set lane change space; and performing the partial braking control according to the third partial control amount to change a lane to the set lane change space.

13. The method of claim 12, wherein the third partial control amount is determined by increasing a reflection rate of the partial control amount corresponding to a manual steering control amount to oppose the driver's manipulation.

14. The method of claim 13, wherein the third partial control amount includes an increment in the partial control amount corresponding to the manual steering control amount to oppose the driver's manipulation, and thus, is determined to be equal to a preset control amount for a lane change.

15. The method of claim 12, wherein a driving torque is applied to an in-wheel motor in an opposite direction to the lane change direction by the partial braking control according to the third partial control amount, and wherein a hydraulic braking torque is applied to a hydraulic brake mounted on a wheel in the lane changing direction while a regenerative braking torque is applied to the in-wheel motor in the lane change direction.

16. The method of claim 1, further including:

after the rotational steering control and the partial braking control of the steering wheel are completed, guiding a driver whether to transit to the manual driving mode.

17. The method of claim 1, further including:

continuously operating a klaxon for collision avoidance and warning with another vehicle when the lane change space in which the collision with the another vehicle is avoided is not checked or set.

18. A non-transitory computer readable storage medium on which a program for performing the method of claim 1 is recorded.

19. A method for controlling a driving mode transition of an autonomous driving vehicle, the method comprising:

checking, by an autonomous driving controller, whether a current driving mode of the autonomous driving vehicle is a manual driving mode;

determining, by the autonomous driving controller, whether there is a cut-in vehicle in an adjacent lane;

determining, by the autonomous driving controller, whether to maintain a safety distance from a rear vehicle when the autonomous driving controller concludes that there is the cut-in vehicle;

checking and setting, by the autonomous driving controller, a lane change space in which a collision with the cut-in vehicle is avoided when the autonomous driving controller concludes that the safety distance from the rear vehicle is not secured; and executing, by the autonomous driving controller, a rotational steering control of a steering wheel and a partial braking control while switching to an autonomous driving mode from the manual driving mode of the autonomous driving vehicle to move into the set lane change space when there is the cut-in vehicle in the adjacent lane after the autonomous driving vehicle is driving in the manual driving mode, wherein the performing of the rotational steering control of the steering wheel and the partial braking control include:

determining a first automated steering control amount and a first partial control amount for the autonomous driving mode when a steering torque of the steering wheel is less than a reference value, wherein, when determining a ratio between the first automated steering control amount and the first partial control amount, the ratio is determined so that only the first partial control amount is reflected at an initial time when the lane change starts according to a reflection rate of a preset control amount for the lane change, and is determined so that the first automated steering control amount increases with a predetermined inclination from the initial time to a time when the lane change ends, and at a same time, is determined so that the first partial control amount decreases with a same inclination thereof.

* * * * *